(12) United States Patent
Xie

(10) Patent No.: US 8,358,689 B2
(45) Date of Patent: *Jan. 22, 2013

(54) SYSTEM AND METHOD FOR PROCESSING VIDEOS AND IMAGES TO A DETERMINED QUALITY LEVEL

(75) Inventor: Ian Xie, Emeryville, CA (US)

(73) Assignee: Ipera Technology, Inc., San Mateo, CA (US)

( * ) Notice: Subject to any disclaimer, the term of this patent is extended or adjusted under 35 U.S.C. 154(b) by 673 days.

This patent is subject to a terminal disclaimer.

(21) Appl. No.: 12/534,817

(22) Filed: Aug. 3, 2009

(65) Prior Publication Data

US 2009/0290063 A1    Nov. 26, 2009

Related U.S. Application Data

(63) Continuation of application No. 11/766,081, filed on Jun. 20, 2007, now Pat. No. 7,813,425.

(60) Provisional application No. 60/867,624, filed on Nov. 29, 2006.

(51) Int. Cl.
*H04B 1/66* (2006.01)
*G06T 5/00* (2006.01)

(52) U.S. Cl. .................................. 375/240.01; 382/260

(58) Field of Classification Search .................. 382/260, 382/263, 264, 167, 162, 265, 262, 261, 298, 382/236, 275, 254, 274; 375/240.01–240.26; 348/452, 700, 701, 663
See application file for complete search history.

(56) References Cited

U.S. PATENT DOCUMENTS

| | | | |
|---|---|---|---|
| 6,408,103 B1 | 6/2002 | Gallagher et al. | |
| 7,098,930 B2 | 8/2006 | MacInnis et al. | |
| 7,136,538 B2 | 11/2006 | Kitagawa | |
| 7,336,720 B2 | 2/2008 | Martemyanov et al. | |
| 7,813,425 B2 | 10/2010 | Xie | |
| 2004/0189865 A1 | 9/2004 | Chen et al. | |
| 2005/0012759 A1 | 1/2005 | Valmiki et al. | |
| 2005/0123057 A1 | 6/2005 | MacInnis et al. | |
| 2005/0168634 A1 | 8/2005 | Wyman et al. | |
| 2005/0231526 A1 | 10/2005 | MacInnis et al. | |
| 2006/0193383 A1 | 8/2006 | Alvarez et al. | |
| 2008/0151101 A1* | 6/2008 | Tian et al. | 348/448 |
| 2009/0290063 A1 | 11/2009 | Xie | |
| 2010/0166335 A1* | 7/2010 | Balram et al. | 382/263 |

OTHER PUBLICATIONS

International Search Report and The Written Opinion corresponding to the PCT application No. PCT/US07/85649, date of mailing Aug. 6, 2008, 10 pages total.
International Preliminary Report and Written Opinion of the International Searching Authority for PCT Application No. US/2007/085649; mailed on Jun. 11, 2009; 7 pages.

* cited by examiner

*Primary Examiner* — Behrooz Senfi
(74) *Attorney, Agent, or Firm* — Ogawa P.C.

(57) ABSTRACT

System and method for processing videos and images to a determined quality level. According to an embodiment, the present invention provides a method for enhancing video. The method includes providing a first video element that is uncompressed. The method also includes determining motion information associated with the video element. The method further includes providing a second video element by removing at least a defect from the first video element. The second video element includes a color luminance and a luminance. In addition, the method includes de-interlacing the second video element using the motion information. Furthermore, the method includes scaling the second video element. Also, the method includes providing a third video element by enhancing the chrominance and enhancing the luminance of the second video element. The method additionally includes outputting the third video element.

35 Claims, 5 Drawing Sheets

SYSTEM AND METHOD FOR PROCESSING VIDEOS AND IMAGES TO A DETERMINED QUALITY LEVEL

CROSS-REFERENCES TO RELATED APPLICATIONS

The present application is a continuation of U.S. patent application Ser. No. 11/766,081, filed Jun. 20, 2007, which claims the benefit of U.S. Provisional Patent Application No. 60/867,624, filed Nov. 29, 2006, the entire disclosures of which are hereby incorporated by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to video and image processing techniques. More particularly, the invention provides a method and system for automatically enhancing videos and images. Merely by way of example, the invention is described as it applies to dynamically processing video and images for viewing, but it should be recognized that the invention has a broader range of applicability.

Over the last decade, with advent of consumer electronics and more specifically media players (e.g., DVD player, player computer, portable multimedia devices, cellular phones, online video processing, etc.) are used for playing media contents in various formats. For a variety of reasons, media contents often need to be processed (e.g., enhanced, adjusted, etc.) before they are presented for viewing and/or other purposes.

Typically, video enhancements include a de-interlacing, removing compression artifacts, scaling, etc. For these, certain conventional techniques have been developed and improved. Some of the conventional techniques such as include noise reduction, contrast enhancement, etc., are derived from traditional image processing techniques. As a result, these techniques are often inadequate. For example, various applications such as video enhancements often require fast processing speeds for providing real time video viewing, and such need often not fulfilled by conventional techniques. Typically, real time is used to indicated that the processes are performed at a sufficient speed to allow non-interrupted viewing. In addition, conventional enhancement techniques implemented as separate functional blocks that are burdensome and sometimes impractical to implement for certain applications (e.g., cellular phone display, real time video streaming over communication networks, etc.).

Hence it is highly desirable to improve techniques for efficiently and effectively enhancing videos and images.

BRIEF SUMMARY OF THE INVENTION

The present invention relates in general to video and image processing techniques. More particularly, the invention provides a method and system for automatically enhancing videos and images. Merely by way of example, the invention is described as it applies to dynamically processing video and images for viewing, but it should be recognized that the invention has a broader range of applicability.

According to an embodiment, the present invention provides a method for enhancing video. The method includes providing a first video element that is uncompressed. The method also includes determining motion information associated with the video element. The method further includes providing a second video element by removing at least a defect from the first video element. The second video element includes a luminance and chrominance. In addition, the method includes de-interlacing the second video element using the motion information. Furthermore, the method includes scaling the second video element. Also, the method includes providing a third video element by enhancing the chrominance and enhancing the luminance of the second video element. The method additionally includes outputting the third video element.

According to another embodiment, the present invention provides method for processing video in real time. The method includes providing a first video element that is characterized by an compression type. The method also includes processing the first video element to generate a second video element in an uncompressed type. The second video element includes one or more defects associated with the compression type. The second video element being characterized by a frame rate and a size. The second video element including a luminance and a chrominance. The method additionally includes removing the one or more defects free from human action. The method further includes determining an output size. Furthermore, the method includes scaling the size of second video element to match the output size. Also, the method includes providing a third video element by modifying the luminance and the chrominance. The method also includes outputting the third video element.

According to yet another embodiment, the present invention provides a method for processing image elements. The method includes providing a image element that is characterized by a first dimension. The method also includes providing a second dimension, the second dimension being associated with a graphical output. In addition, the method includes comparing the first dimension and the second dimension. Furthermore, the method includes enhancing the image element before scaling the image element if the first dimension is smaller than the second dimension. The method additionally includes scaling down the image element before enhancing the image element if the first dimension is greater than the second dimension. Furthermore, the method includes providing the graphical output being characterized by the second dimension.

According to yet another embodiment, the present invention provides a method for processing image elements. The method includes providing a first image element that is uncompressed. The method additionally includes providing a first data and a second data. The first data is associated with a chrominance of the first image element. The second data is associated with a luminance of the first image element. The method further includes manipulating the first data. Additionally, the method includes manipulating the second data. Furthermore, the method includes providing a second image element. The second image element is based on the first image element, the manipulated first data and the manipulated second data. The manipulating the first and manipulating the second data are performed in parallel.

According to yet another embodiment, the present invention provides a system for processing one or more image elements. The system includes an interface for receiving a first image element. The system additionally includes a first module for providing a second image element by removing at least one graphical defect from the first image element. The system also includes a second module for providing a third image element by at least de-interfacing the second module. The de-interfacing involves using motion information that is associated with the second image element. The system further includes a fourth module for providing a fourth image element by at least scaling the third image element. The fourth image element and the third image element have substantially equal aspect ratios. Additionally, the system includes a fifth module for providing a fifth image element by enhancing a luminance and a chrominance of the fourth image element.

It is to be appreciated that embodiments according to the present invention offer various advantages over conventional techniques. For example, the embodiments of the present invention provide an integrated and efficient solution for enhancing videos and/or images. In a specific embodiment, the present invention provides a mechanism for saving computational resources by optimizing the sequence for video processing. In another embodiment, the present invention provides a technique for performing different enhancements in parallel, thus reducing processing time. Furthermore, embodiments of the present invention can be integrated into conventional systems with ease. There are other benefits as well.

Various additional objects, features and advantages of the present invention can be more fully appreciated with reference to the detailed description and accompanying drawings that follow.

DETAILED DESCRIPTION OF THE INVENTION

The present invention relates in general to video and image processing techniques. More particularly, the invention provides a method and system for automatically enhancing videos and images. Merely by way of example, the invention is described as it applies to dynamically processing video and images for viewing, but it should be recognized that the invention has a broader range of applicability.

As discussed above, conventional techniques for enhancing images and videos are often inadequate. More specifically, conventional techniques often do not offer an integrated solution for video and/or image enhancement that is fast and efficient enough for many of today's applications.

Therefore, it is to be appreciated that various embodiments of the present invention provides an integrated and efficient solution for video and/or image processing. Video enhancements according to the present invention are to improve subjective visual quality of video sequence for a wide variety of display devices in order to give viewers and/or users a more pleasant viewing experience. For example, these goals are achieved by using various mathematical algorithms, which are implemented as firmware on embedded systems, IC chips and other digital processors/systems, and/or as software modules.

These algorithms change pixel values of digital video frames/fields and may include a temporal domain processing (inter-frames). In particular, luminance and chrominance enhancements play a vital role in video enhancement due to the sensitivity of human eyes to contrast, details as well as primary colors. Typically, luminance enhancement includes dynamic contrast/brightness enhancement and edge enhancement. For example, the dynamic contrast/brightness enhancement is for adjusting overall brightness and increase contrast of a video frame/field. The edge enhancement is usually use for sharpening edges so as to exhibit details better that are usually visually more noticeable in a video frame/field. Chrominance enhancements are directed to adjusting various colors (e.g., primary colors such as read, green and blue) in color spaces so that video will look more vivid and saturated. In certain application, chrominance enhancement includes skin tone enhancement that makes skin color more natural and fresh. In certain instances, the improvements not measured in quantifiable terms, but are easily appreciated by the eyes average consumers if the techniques are effectively implemented.

There are other types of enhancements. For example, some of the subtle improvements such as distortion reduction, artifacts removal, etc., need to be appreciated by trained eyes. In various embodiments, the present invention provides systems and techniques where these enhancements are performed.

Figure 1:
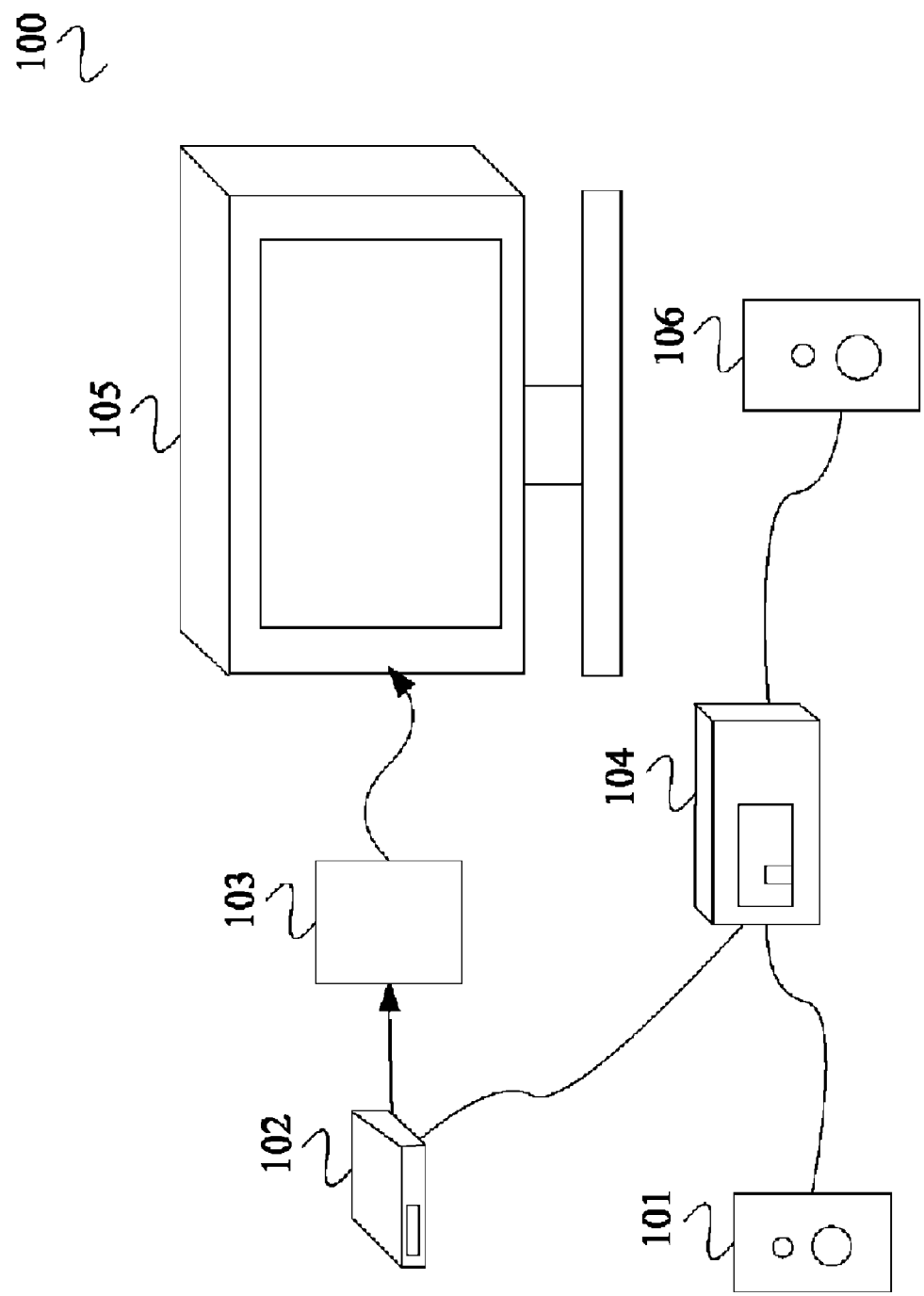
FIG. 1 is a simplified diagram illustrating a system for implementing an embodiment of the present invention.

FIG. 1 is a simplified diagram illustrating a system for implementing an embodiment of the present invention. This diagram is merely an example, which should not unduly limit the scope of the claims. One of ordinary skill in the art would recognize many variations, alternatives, and modifications. As shown in FIG. 1, an entertainment system 100 includes a source component 102, a graphical processor 103, an audio processor 104, speakers 101 and 106, and a display 105.

The source component 102 is configured to provide images and videos. For example, the source component is a DVD player that depressed video stored on DVDs. In addition, the source component 102 may output images (e.g., from a photo CD) as well. Depending on the application, the source component 102 may also be a VHS player, a blu-ray player, etc. As an example, the source component 102 includes a communication interface for receiving videos and/or images from communication networks. In a specific embodiment, the source component 102 receives videos and images over the Internet. In another specific embodiment, the source component 102 receives videos and images over a wireless communication network.

The source component 102 is configured to provide uncompressed video and audio outputs. As an example, the source component 102 includes hardware decoder for decoding compressed media contents. For example, compressed media contents (e.g., movies stored on a DVD) are decoded by a hardware decoder of the source component. As an example, the uncompressed video data outputted by the source component 102 is in compliance with a YUV 420 standard. As another example, the source component 102 is a media reader that decodes compressed images (e.g., JPEG images) for display. The decompressed audio is sent to the audio processor 104, which may be a receiver, an amplifier, etc. As an example, the audio processor 104 is configured to provide output to audio devices, such as speakers 101 and 106. The decompressed video and/or image are sent to the graphical processor 103.

The graphical processor 103 is used to perform a variety of functions for enhancing the decompressed videos and/or images received from the source component 102. The graphical processor 103 then output the enhanced videos and/or images to the display 105. For example, the display 105 is a liquid crystal display (LCD). In various embodiments, the graphical processor 103 is configured boost output signals specifically for the LCD display.

It is to be appreciated that that various embodiments of the present invention may be implemented in many ways. Various techniques according to the present invention may be implemented as embedded chipsets for different types of devices (e.g., cellular phone, portable media player, camcorder, displays, etc.). In addition, embodiments according to the present invention can be implemented using software, thereby allowing existing devices (e.g., computer, personal digital assistant, smart phone, etc.) to utilize various techniques from the present invention.

Figure 2:
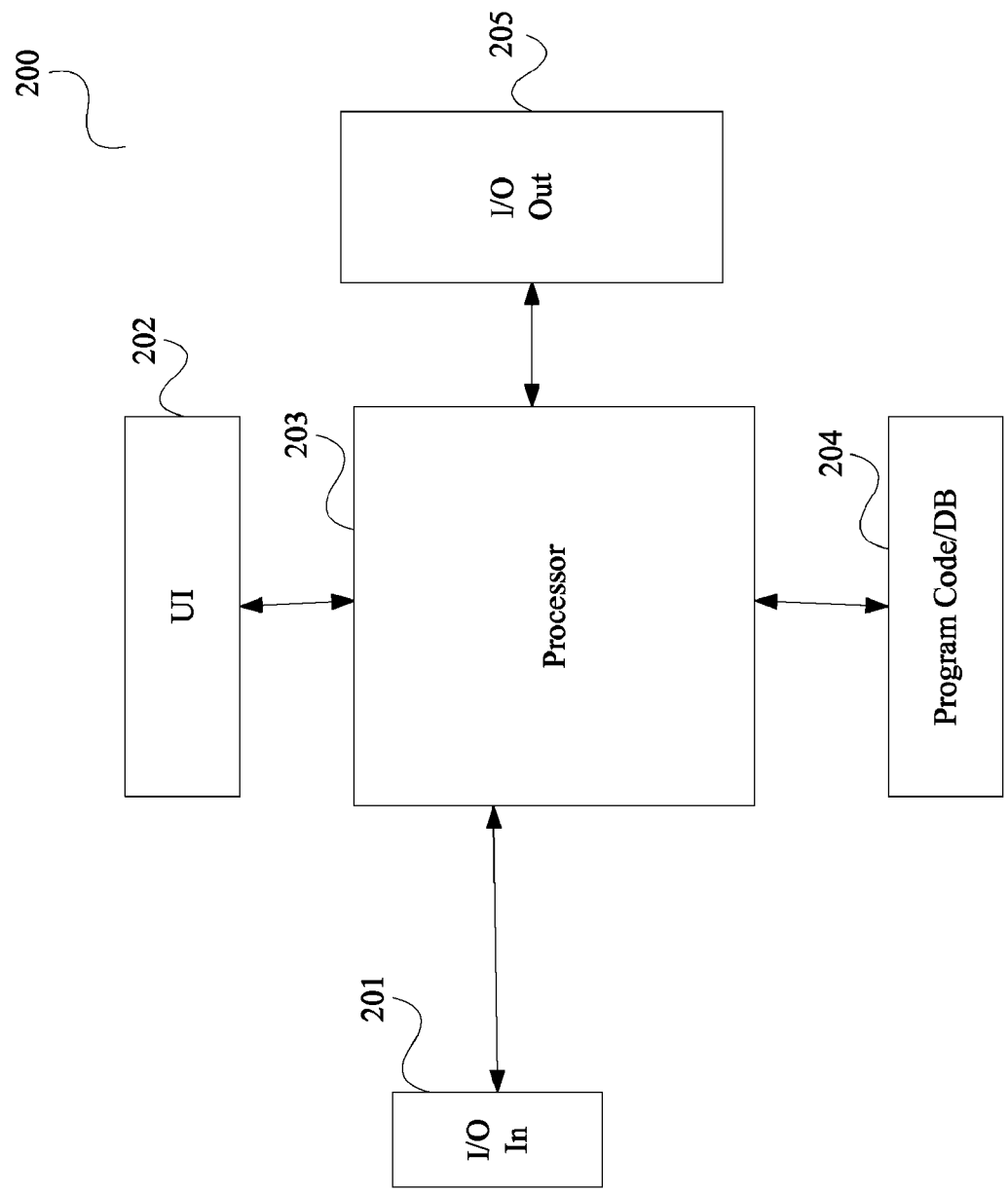
FIG. 2 is a functional block diagram illustrating a graphical processor according the present invention.

FIG. 2 is a functional block diagram illustrating a graphical processor according the present invention. This diagram is merely an example, which should not unduly limit the scope of the claims. One of ordinary skill in the art would recognize many variations, alternatives, and modifications. As shown in FIG. 2 a graphical processor 200 includes an input 201, a user interface 202, a processor 203, a memory 204, and an output 205. Depending on the specific application, the input 201 may be a VGA interface, a video interface, or other types of graphical interface. Likely, the output 205 may be implemented as various types of graphical interfaces. The memory 204 is used to store code for graphical enhancement.

Figure 3:
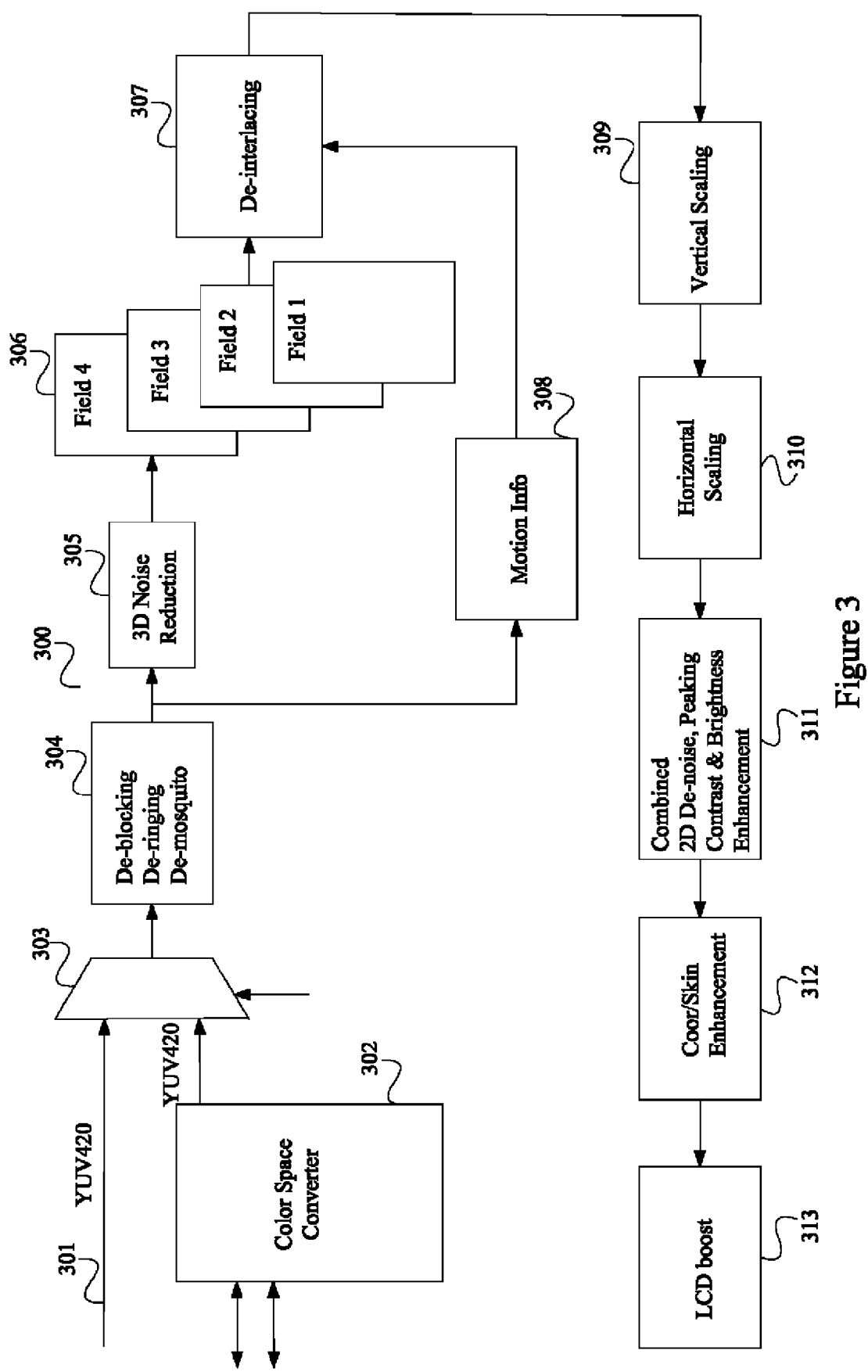
FIG. 3 is a functional block diagram illustrating a graphical enhancement system according to an embodiment of the present invention.

FIG. 3 is a functional block diagram illustrating a graphical enhancement system according to an embodiment of the present invention. This diagram is merely an example, which should not unduly limit the scope of the claims. One of ordinary skill in the art would recognize many variations, alternatives, and modifications.

As shown in FIG. 3, a graphical enhancement system 300 includes the following components:

1. an input 301;
2. a color space converter 302;
3. an input selector 303;
4. a defect removing module 304;
5. a 3D noise reduction module 305;
6. a de-interlacing module 307;
7. a vertical scaling module 309;
8. a horizontal scaling module 310;
9. a luminance enhancement module 311;
10. a chrominance enhancement module 312; and
11. a LCD boost module 313.

According to an embodiment, the system 300 is used for enhancing video and/or images in real time. The system 300 receives an input, which may include video and/or image information, in an uncompressed format. For example, the input complies with YUV 420 format. Depending upon the application the system 300 may process other formats (e.g., YUV 422, YUV 444, etc.) as well. Sometimes, the received input needs to be converted into proper color space. The color space converter 302 is configured to convert images and/or videos from one color space to another. The selector 303 is used to select proper video and/or image that are to be processed. For example, the selector 303 selects videos and/or images that are in the proper color space for processing. In certain embodiments, when the received video and/or images are stored in a buffer before processing.

The selected videos and/or images are then processed by the module 304 to remove various defects. In a specific embodiment, the module 304 is specifically configured to remove artifacts, such as blocks, ringing, mosquitos, moiré, etc., associated with video and/or image compression. For example, the module 304 performs de-blocking, de-ringing, and/or de-mosquito. It is to be understood that the module 304 may remove other types of defects as well, such as moiré, etc. After the module 304 removes defects, motion information is obtained and provided to the module 307. Depending upon the specific application, the motion information may include motion adaptive data and/or motion compensation data that can be used for the process of de-interlacing.

The module 305 is used for performing 3D noise reduction. As an example, 3D noise reduction according to an embodiment of the present invention involves comparing two frames in a video for removing certain types of noises. As an example, the 3D noise reduction process is applied to different fields of the video and/or image.

The module 307 is used for de-interlacing the video and/or image. Typically, de-interlacing is required for many types of displays. However, an interlaced image involves scan of alternate lines at a given time, which is typically acceptable for CRT type of display. For example, LCDs and plasma displays are inherently progressive scan and are typically unable to properly display interlaced video and/or images. A de-interlacing process often involves temporal interpolation of image so every line is displayed. In addition, de-interlacing can also reduce flicker or other types of distortions. In a specific embodiment, the module 307 uses a motion adaptive technique for de-interlacing. In another embodiment, the module 307 uses a motion compensated technique for de-interlacing. The module 307 may use other types of de-interlacing techniques as well.

The module 309 is used for performing vertical scaling. For example, the input video and/or image resolution often does not match the output format. For example, for a standard VGA video (640×480) to be displayed on a HD 1080p display (1920×1080), the VGA video needs to be scaled up. In an embodiment, the module 309 automatically performs scaling based on the input and output resolutions. In addition, the module 309 may also determine the aspect ratio to determine if the same aspect ratio is to be used or a new aspect ratio is to be used. For example, to convert VGA size to 1080p size, the aspect ratios are different: VGA is 4:3 and 1080p is 16:9. To preserve some of the aspect ratio, some part of the 1080p display is left blank. Alternatively, the VGA size is crop or stretched to fit. As an example, the module 309 may use various types of scaling techniques, such as resampling, interpolation, etc.

The module 310 is used for performing horizontal scaling. As explained above, the module 310 may apply various types of scaling technique. The scaling factor used for horizontal scaling may be based on a scaling factor determined by the module 309 as a function of the input and output aspect ratio and resolution. In a specific embodiment, horizontal scaling factor is determined independently by the module 310.

The module 311 is provided for enhancing video and/or images related to luminance. In image and video processing systems, luminance includes signal used to carry luma information. In various embodiments, the module 311 is used for noise reduction, peaking adjustment, contrast and brightness adjustment, etc. For example, peaking adjustment selectively adjusting high frequency components in a video and/or image, thereby improving details and edges in the video and/or image. The module 311 can perform other types of luminance-based enhancements as well. In a specific embodiment, the module 311 performs luminance enhancement in an integrated process. In a specific embodiment, the module 311 performs a black and white extension. As an example, the black and white extension provides true black and true white for viewing.

The module 312 is provided for enhancing video and/or images related to chrominance. In image and video processing systems, chrominance includes signal used to carry color information. In various embodiments, the module 312 is used for color and/or skin tone adjustments, etc. The module 312 can perform other types of chrominance-based enhancements as well. In a specific embodiment, the module 312 performs luminance enhancement in an integrated process. Depending on the specific application, luminance and chrominance enhancements as performed by the modules 311 and 312 may be performed in series or parallel, and the order of which may be reversed.

The module 313 is used for providing LCD boosts. Typically, video and/or image signals that are for CRT type of display are often not bright or strong enough. The module 313 is used for provide a boost so the video and/or image can be properly displayed. In addition, in an exemplary embodiment the module 313 is also capable of removing motion blur associated with LCD display.

Figure 4:
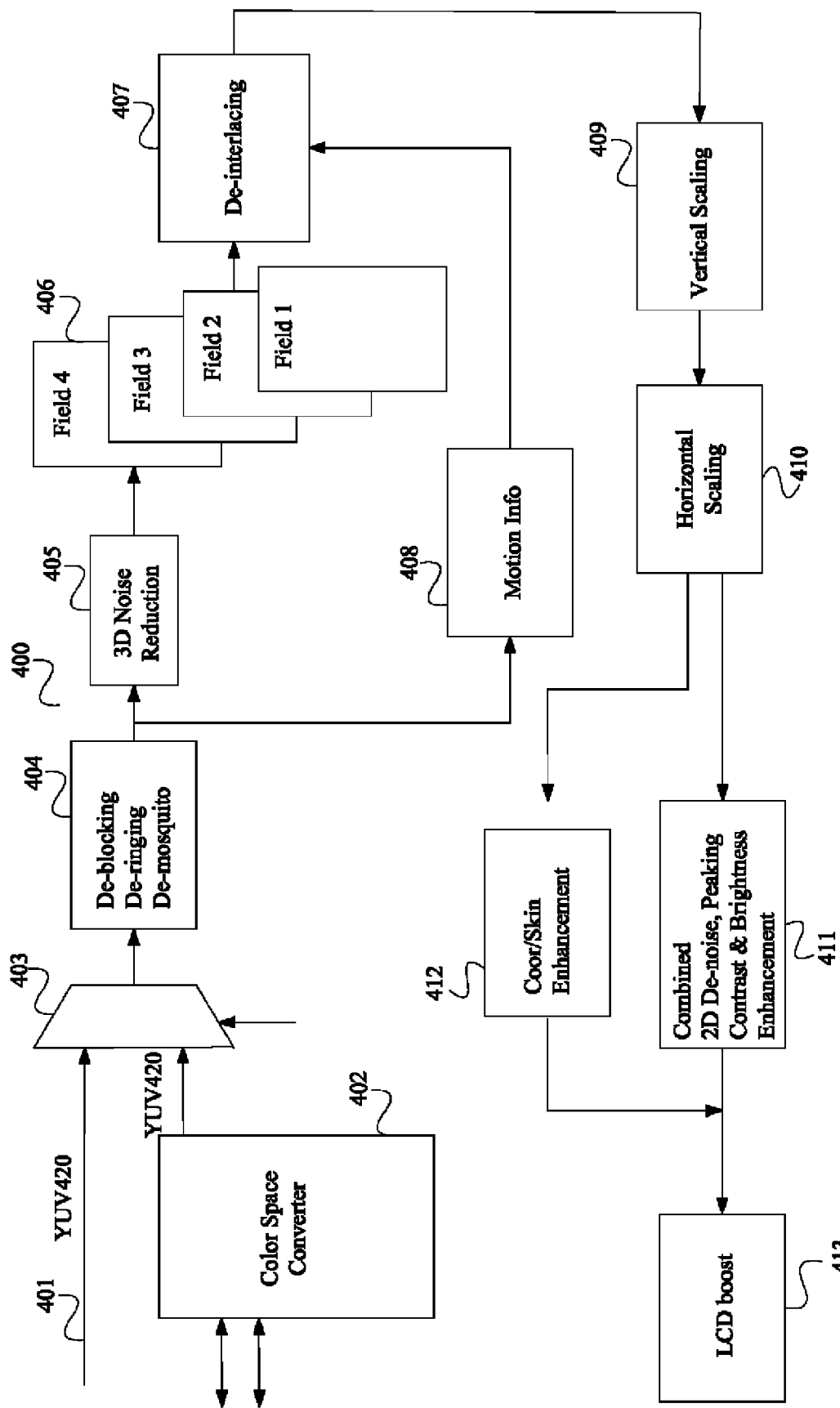
FIG. 4 is a functional block diagram illustrating a graphical enhancement system according to another embodiment of the present invention.

FIG. 4 is a functional block diagram illustrating a graphical enhancement system according to an alternative embodiment of the present invention. This diagram is merely an example, which should not unduly limit the scope of the claims. One of ordinary skill in the art would recognize many variations, alternatives, and modifications.

As shown in FIG. 4, a graphical enhancement system 400 includes the following components:
1. an input 401;
2. a color space converter 402;
3. an input selector 403;
4. a defect removing module 404;
5. a 3D noise reduction module 405;
6. a de-interlacing module 407;
7. a vertical scaling module 409;
8. a horizontal scaling module 410;
9. a luminance enhancement module 411;
10. a chrominance enhancement module 412; and
11. a LCD boost module 413.

According to an embodiment, the system 400 is used for enhancing video and/or images in real time. The system 400 receives an input, which may include video and/or image information, in an uncompressed format. For example, the input complies with YUV 420 format. Depending upon the application the system 400 may process other formats (e.g., YUV 422, YUV 444, etc.) as well. Sometimes, the received input needs to be converted into proper color space. The color space converter 402 is configured to convert images and/or videos from one color space to another. The selector 403 is used to select proper video and/or image that are to be processed. For example, the selector 403 selects videos and/or images that are in the proper color space for processing.

The selected videos and/or images are then processed by the module 404 to remove various defects. In a specific embodiment, the module 404 is specifically configured to remove artifacts associated with video and/or image compression. For example, the module 404 performs de-blocking, de-ringing, and/or de-mosquito. It is to be understood that the module 404 may remove other types of defects as well, such as moiré, etc. After the module 404 removes defects, motion information is obtained and provided to the module 407. Depending upon the specific application, the motion information may include motion adaptive data and/or motion compensation data that can be used for the process of de-interlacing.

The module 405 is used for performing 3D noise reduction. In various embodiments, the 3D noise reduction performed by the module 405 involves removing noise from two spatial dimensions and a temporal dimension. According to certain alternative embodiments, the module 405 is also capable of performing 2D and/or 3D noise reduction. As an example, a 3D noise reduction according to an embodiment of the present invention involves comparing two frames in a video for removing certain types of noises. As an example, the 3D noise reduction process is applied to different fields of the video and/or image.

The module 407 is used for de-interlacing the video and/or image. Typically, de-interlacing is required for many types of displays. For example, LCDs and plasma displays are inherently progressive scan and are typically unable to properly display interlaced video and/or images. In addition, de-interlacing can also reduce flicker or other types of distortions. In a specific embodiment, the module 407 uses a motion adaptive technique for de-interlacing. In another embodiment, the module 407 uses a motion compensated technique for de-interlacing. The module 407 may use other types of de-interlacing techniques as well.

The module 409 is used for performing vertical scaling. For example, the input video and/or image resolution often does not match the output format. For example, for a standard VGA video (640×480) to be displayed on a HD 1080p display (1920×1080), the VGA video needs to be scaled up. In an embodiment, the module 409 automatically performs scaling based on the input and output resolutions. In addition, the module 409 may also determine the aspect ratio to determine if the same aspect ratio is to be used or a new aspect ratio is to be used. For example, to convert VGA size to 1080p size, the aspect ratios are different: VGA is 4:3 and 1080p is 16:9. To preserve some of the aspect ratio, some part of the 1080p display is left blank. Alternatively, the VGA size is crop or stretched to fit. As an example, the module 409 may use various types of scaling techniques, such as resampling, interpolation, etc.

The module 410 is used for performing horizontal scaling. As explained above, the module 410 may apply various types of scaling technique. The scaling factor used for horizontal scaling may be based on a scaling factor determined by the module 409 as a function of the input and output aspect ratio and resolution. In a specific embodiment, horizontal scaling factor is determined independently by the module 410.

According to an embodiment, the modules 411 and the module 412 enhance videos and/or images independently in parallel. For example, the module 412 is specifically designed to enhance videos and/or images by processing chrominance information (U and V channels of the YUV signal). The module 411 is specifically designed to enhance videos and/or images by processing luminance information (Y channel of the YUV signal).

The module 411 is provided for enhancing video and/or images related to luminance. In various embodiments, the module 411 is used for noise reduction, peaking adjustment, contrast and brightness adjustment, etc. The module 411 can perform other types of luminance-based enhancements as well. In a specific embodiment, the module 411 performs luminance enhancement in an integrated process.

The module 412 is provided for enhancing video and/or images related to chrominance. In various embodiments, the module 412 is used for color and/or skin tone adjustments, etc. The module 412 can perform other types of chrominance-based enhancements as well. In a specific embodiment, the module 412 performs luminance enhancement in an integrated process.

The module 413 is used for providing LCD boosts. Typically, video and/or image signals that are for CRT type of display are often not bright or strong enough. The module 413 is used for provide a boost so the video and/or image can be properly displayed.

Figure 5:
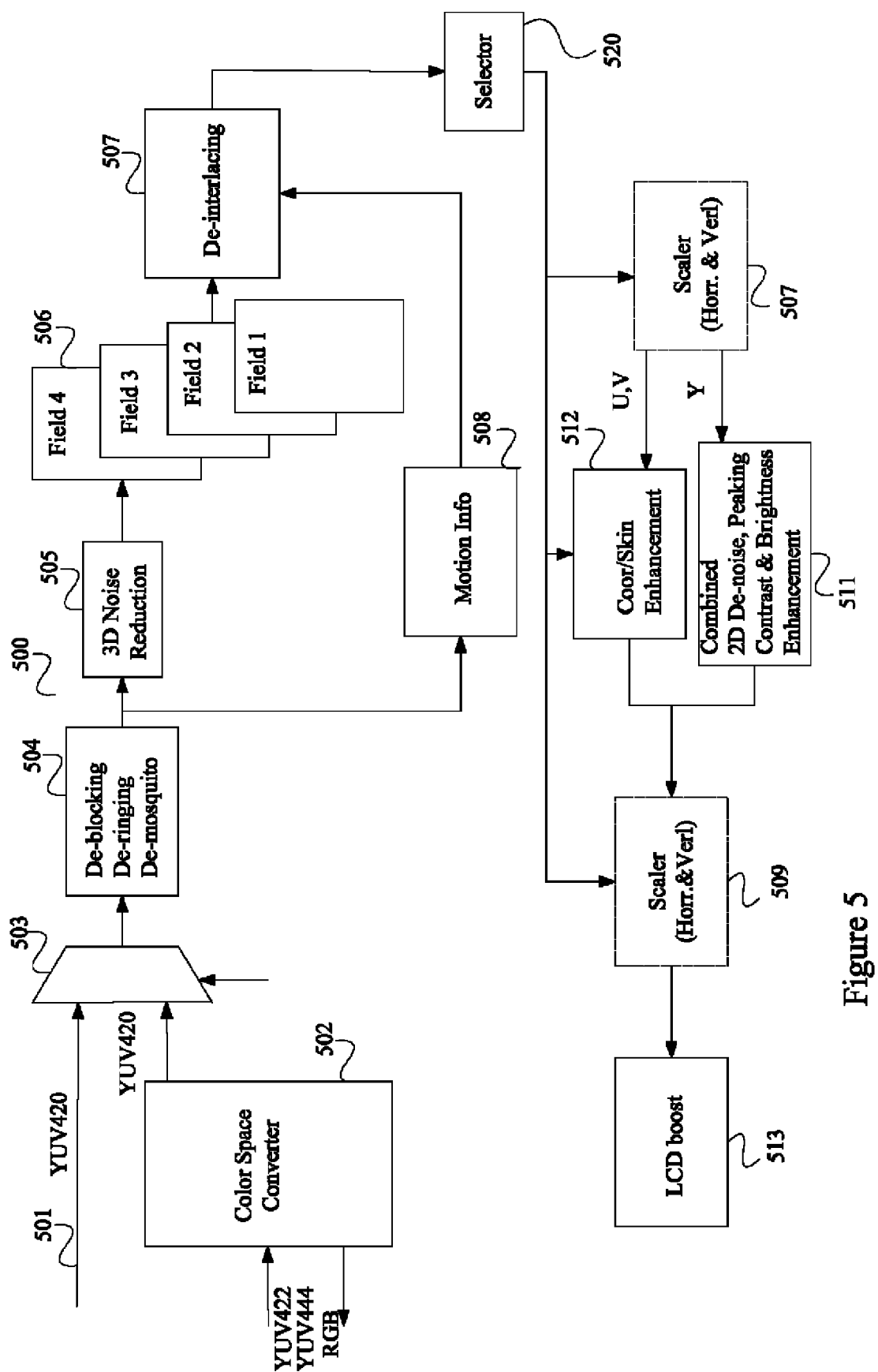
FIG. 5 is a functional block diagram illustrating a graphical enhancement system according to an alternative embodiment of the present invention.

FIG. 5 is a functional block diagram illustrating a graphical enhancement system according to an alternative embodiment of the present invention. This diagram is merely an example, which should not unduly limit the scope of the claims. One of ordinary skill in the art would recognize many variations, alternatives, and modifications.

As shown in FIG. 5, a graphical enhancement system 500 includes the following components:
1. an input 501;
2. a color space converter 502;
3. an input selector 503;
4. a defect removing module 504;
5. a 3D noise reduction module 505;
6. a de-interlacing module 507;
7. a scaling module 509;
8. a module selector 520;
9. a luminance enhancement module 511;
10. a chrominance enhancement module 512; and
11. a LCD boost module 513.

According to an embodiment, the system 500 is used for enhancing video and/or images in real time. The system 500 receives an input, which may include video and/or image information, in an uncompressed format. For example, the input complies with YUV 420 format. Depending upon the application the system 500 may process other formats (e.g., YUV 422, YUV 444, etc.) as well. Sometimes, the received input needs to be converted into proper color space. The color space converter 502 is configured to convert images and/or videos from one color space to another. The selector 503 is used to select proper video and/or image that are to be processed. For example, the selector 503 selects videos and/or images that are in the proper color space for processing.

The selected videos and/or images are then processed by the module 404 to remove various defects. In a specific embodiment, the module 504 is specifically configured to remove artifacts associated with video and/or image compression. For example, the module 504 performs de-blocking, de-ringing, and/or de-mosquito. It is to be understood that the module 504 may remove other types of defects as well, such as moiré, etc. After the module 404 removes defects, motion information is obtained and provided to the module 507. Depending upon the specific application, the motion information may include motion adaptive data and/or motion compensation data that can be used for the process of de-interlacing.

The module 505 is used for performing 3D noise reduction. As an example, 3D noise reduction according to an embodiment of the present invention involves comparing two frames in a video for removing certain types of noises. As an example, the 3D noise reduction process is applied to different fields of the video and/or image.

The module 507 is used for de-interlacing the video and/or image. Typically, de-interlacing is required for many types of displays. For example, LCDs and plasma displays are inherently progressive scan and are typically unable to properly display interlaced video and/or images. In addition, de-interlacing can also reduce flicker or other types of distortions. In a specific embodiment, the module 507 uses a motion adaptive technique for de-interlacing. In another embodiment, the module 507 uses a motion compensated technique for de-interlacing. The module 507 may use other types of de-interlacing techniques as well.

The selector 520 is used to determine the order in which scaling and enhancement processes are performed. It is to be appreciated that the selector 520 reduces the computational costs involved with scaling and enhancement. In a specific embodiment, the selector 520 compares the input resolution and output resolution. If the input videos and/or images are to be scaled up, it is more efficient to perform enhancement before scaling. For example, it is computationally cheaper to perform enhancement when videos and/or images are at smaller sizes. On the other hand, if the input videos and/or images are to be scaled down, it is more efficient to perform enhancement after scaling. Once the selector 520 determines the order for performing scaling and enhancement, the videos and/or images are sent to the module 509 or the modules 512 and 513.

The module 509 is used for performing both vertical and horizontal scaling. For example, the input video and/or image resolution often does not match the output format. For example, for a standard VGA video (640×480) to be displayed on a HD 1080p display (1920×1080), the VGA video needs to be scaled up. In an embodiment, the module 509 automatically performs scaling based on the input and output resolutions. In addition, the module 509 may also determine the aspect ratio to determine if the same aspect ratio is to be used or a new aspect ratio is to be used. For example, to convert VGA size to 1080p size, the aspect ratios are different: VGA is 4:3 and 1080p is 16:9. To preserve some of the aspect ratio, some part of the 1080p display is left blank. Alternatively, the VGA size is crop or stretched to fit. As an example, the module 509 may use various types of scaling techniques, such as resampling, interpolation, etc. The scaling factor used for horizontal scaling may be based on a scaling factor related to the vertical scaling as a function of the input and output aspect ratio and resolution.

According to an embodiment, the modules 511 and the module 512 enhance videos and/or images independently in parallel. For example, the module 512 is specifically designed to enhance videos and/or images by processing chrominance information (U and V channels of the YUV signal). The module 511 is specifically designed to enhance videos and/or images by processing luminance information (Y channel of the YUV signal).

The module 511 is provided for enhancing video and/or images related to luminance. In various embodiments, the module 511 is used for noise reduction, peaking adjustment, contrast and brightness adjustment, etc. The module 511 can perform other types of luminance-based enhancements as well. In a specific embodiment, the module 511 performs luminance enhancement in an integrated process.

The module 512 is provided for enhancing video and/or images related to chrominance. In various embodiments, the module 512 is used for color and/or skin tone adjustments, etc. The module 512 can perform other types of chrominance-based enhancements as well. In a specific embodiment, the module 512 performs luminance enhancement in an integrated process.

The module 513 is used for providing LCD boosts. Typically, video and/or image signals that are for CRT type of display are often not bright or strong enough. The module 513 is used for provide a boost so the video and/or image can be properly displayed.

According to an embodiment, the present invention provides a method for enhancing video. The method includes providing a first video element that is uncompressed. The method also includes determining motion information associated with the video element. The method further includes providing a second video element by removing at least a defect from the first video element. The second video element includes a color luminance and a light luminance. In addition, the method includes de-interlacing the second video element using the motion information. Furthermore, the method includes scaling the second video element. Also, the method includes providing a third video element by enhancing the chrominance and enhancing the luminance of the second video element. The method additionally includes outputting the third video element. For example, the embodiment is illustrated according to FIG. 3.

According to yet another embodiment, the present invention provides a method for processing image elements. The method includes providing a image element that is characterized by a first dimension. The method also includes providing a second dimension, the second dimension being associated with a graphical output. In addition, the method includes comparing the first dimension and the second dimension. Furthermore, the method includes enhancing the image element before scaling the image element if the first dimension is smaller than the second dimension. The method additionally includes scaling down the image element before enhancing the image element if the first dimension is greater than the second dimension. Furthermore, the method includes providing the graphical output being characterized by the second dimension. For example, the embodiment is illustrated according to FIG. 5.

According to yet another embodiment, the present invention provides a method for processing image elements. The method includes providing a first image element that is uncompressed. The method additionally includes providing a first data and a second data. The first data is associated with a chrominance of the first image element. The second data is associated with a luminance of the first image element. The method further includes manipulating the first data. Additionally, the method includes manipulating the second data. Furthermore, the method includes providing a second image element. The second image element is based on the first image element, the manipulated first data and the manipulated second data. The manipulating the first and manipulating the second data are performed in parallel. For example, the embodiment is illustrated according to FIG. 4.

According to yet another embodiment, the present invention provides a system for processing one or more image elements. The system includes an interface for receiving a first image element. The system additionally includes a first module for providing a second image element by removing at least one graphical defect from the first image element. The system also includes a second module for providing a third image element by at least de-interfacing the second module. The de-interfacing involves using motion information that is associated with the second image element. The system further includes a fourth module for providing a fourth image element by at least scaling the third image element. The fourth image element and the third image element have substantially equal aspect ratios. Additionally, the system includes a fifth module for providing a fifth image element by enhancing a chrominance and a luminance of the fourth image element. For example, the embodiment is illustrated according to FIG. 3.

It is to be appreciated that embodiments according to the present invention offer various advantages over conventional techniques. For example, the embodiments of the present invention provide an integrated and efficient solution for enhancing videos and/or images. In a specific embodiment, the present invention provides a mechanism for saving computational resources by optimizing the sequence for video processing. In another embodiment, the present invention provides a technique for performing different enhancements in parallel, thus reducing processing time. Furthermore, embodiments of the present invention can be integrated into conventional systems with ease. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for processing videos in real time, the method comprising:
providing a first video element, the video element being uncompressed;
storing the first video element in a first memory;
providing a second video element by removing at least a defect from the first video element free from human action using a processor, the processor being configured to access and process the first video element stored at the first memory, the defect being associated with a video compression, the second video element including a luminance and a chrominance;
performing de-interlacing the second video element if a first condition is satisfied;
scaling the second video element free from a human action;
providing a third video element by modifying the luminance and modifying the chrominance of the second video element; and
outputting the third video element.

2. The method of claim 1 wherein the scaling comprises enlarging or reducing a size of the second video element to match an output screen size.

3. The method of claim 1 wherein the first video element comprises a video file.

4. The method of claim 1 wherein the first video element comprises a video stream received from a network interface.

5. The method of claim 1 wherein the modifying the luminance comprises adjusting peaking and contrast in a single step.

6. The method of claim 1 wherein the first condition comprises the first video element being interlaced.

7. The method of claim 1 wherein the first condition comprises an output display being progressive scan.

8. The method of claim 1 further comprising receiving a fourth video element over a communication network.

9. The method of claim 1 further comprising determining motion information associated with the video element, wherein the de-interlacing the second video element comprises using the motion information.

10. The method of claim 1 further comprising providing the first video element by converting a fourth video element from a first color space to a second color space.

11. The method of claim 1 further comprising decompressing a fourth video element to provide the first video element.

12. The method of claim 1 wherein the first video element is in compliance with a YUV standard.

13. The method of claim 1 wherein the first video element is in compliance with a standard, wherein the luminance and chrominance are independently stored.

14. The method of claim 1 further comprising boosting the third video element for liquid crystal display.

15. The method of claim 1 wherein the enhancing the chrominance comprises enhancing a color associated with the second video element.

16. The method of claim 1 wherein the enhancing the luminance comprises adjusting a contrast associated with the second video element.

17. The method of claim 1 wherein the enhancing the luminance comprises providing a black and white extension.

18. The method of claim 1 wherein the enhancing the luminance comprises adjusting a brightness associated with the second video element.

19. The method of claim 1 wherein the enhancing the luminance comprises removing two-dimensional noises associated with the second video element.

20. The method of claim 1 wherein the enhancing the luminance comprises adjusting a peaking associated with the second video element.

21. The method of claim 1 wherein the defect comprises blocking.

22. The method of claim 1 wherein the defect comprises a noise defect.

23. The method of claim 1 wherein the defect comprises a mosquito artifact.

24. The method of claim 1 wherein the chrominance and the luminance are enhanced in parallel.

25. The method of claim 1 wherein the chrominance and the luminance are enhanced in series.

26. The method of claim 1 wherein motion information comprises motion adaptive information.

27. The method of claim 1 wherein motion information comprises motion compensated information.

28. A method for processing video in real time, the method comprising:
receiving a first video element by an interface module, the first video element being characterized by a compression type;
storing the first video element in a first memory;
processing the first video element to generate a second video element in an uncompressed type using a processor, the processor being configured to access the first video element from the first memory, the second video element including one or more defects associated with the compression type, the second video element being characterized by a frame rate and a size, the second video element including a luminance and a chrominance;
generating a third video element by removing the one or more defects free from human action from the second video element;
determining an output size;
generating a fourth video element by scaling the size of third second video element to match the output size;
providing a fourth third video element by modifying the luminance and the chrominance of the third video element; and
outputting the fourth third video element.

29. The method of claim 28 further comprising de-interlacing the second video element by aligning a first field and a second field of the second video element.

30. The method of claim 28 further comprising de-interlacing the second video element by adding a first field and a second field of the second video element.

31. The method of claim 28 further comprising de-interlacing the second video element by blending a first field and a second field of the second video element.

32. The method of claim 28 wherein the scaling comprises enlarging or shrinking the size of the fourth second video element based on the output size.

33. The method of claim 28 wherein the third video is generated by the processor.

34. The method of claim 28 wherein the removing the one or more defects comprises de-blocking.

35. The method of claim 28 wherein the removing the one or more defects comprises performing a de-mosquito process.

* * * * *